Sept. 8, 1936.  A. BORLAND ET AL  2,053,692
SAFETY DEVICE FOR AUTOMOBILES
Filed March 5, 1936  2 Sheets-Sheet 2
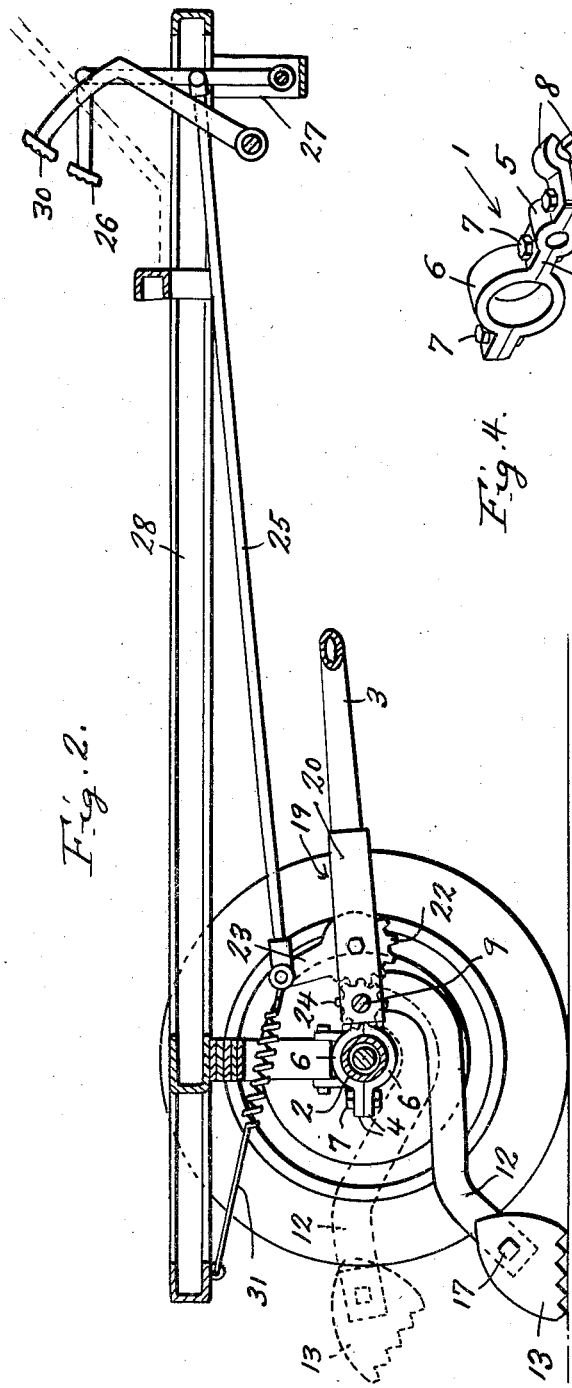
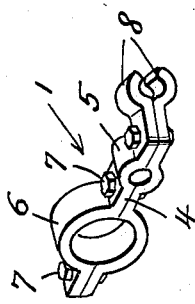
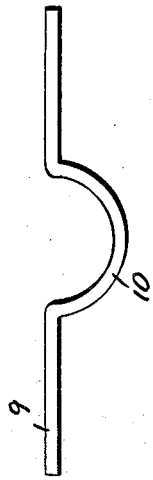
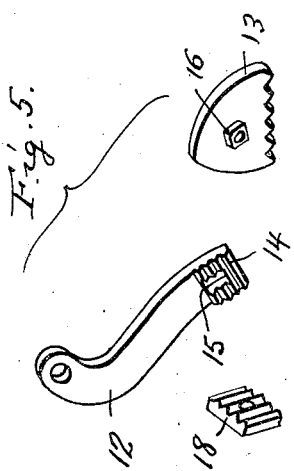
Inventors
Albert Borland
Myrtle Borland
By Clarence A. O'Brien and
Hyman Berman
Attorneys Patented Sept. 8, 1936

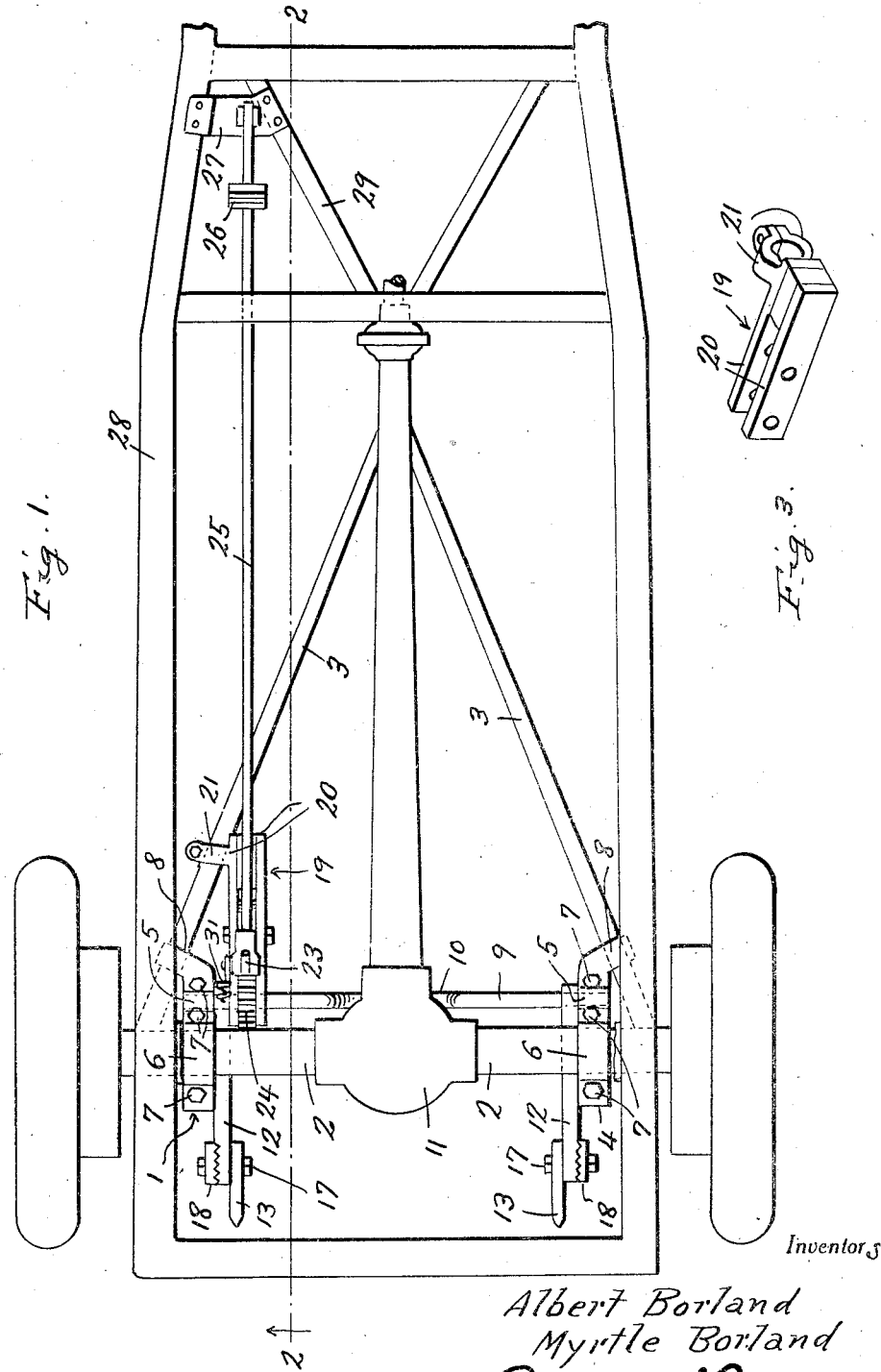

2,053,692

UNITED STATES PATENT OFFICE 2,053,692

SAFETY DEVICE FOR AUTOMOBILES

Albert Borland and Myrtle Borland,
Davisburg, Mich.

Application March 5, 1936, Serial No. 67,374

3 Claims. (Cl. 188—5)

The present invention relates to new and useful improvements in vehicle safety devices and has for its primary object to provide, in a manner as hereinafter set forth, novel means for preventing automobiles from skidding or sliding on streets and highways which are slippery with ice, snow, etc.

Another very important object of the invention is to provide a vehicle safety device of the aforementioned character which may be used as a ground engaging brake for bringing the vehicle to a stop when desired.

Still another important object of the invention is to provide a safety apparatus of the character described embodying novel means for mounting said apparatus on the chassis of an automobile.

Still another very important object of the invention is to provide a vehicle safety device comprising a plurality of ground engaging sprags, said sprags including adjustably mounted toothed feet.

Other objects of the invention are to provide a safety device for automobiles which will be comparatively simple in construction, strong, durable, highly efficient and reliable in operation, compact, light in weight and which may be manufactured and installed at low cost.

All of the foregoing and still further objects and advantages of the invention will become apparent from a study of the following specification, taken in connection with the accompanying drawings wherein like characters of reference designate corresponding parts throughout the several views, and wherein:—

Figure 1 is a view in top plan of the invention, showing the same installed on an automobile chassis.

Figure 2 is a view in vertical longitudinal section, taken substantially on the line 2—2 of Figure 1.

Figure 3 is a detail view in perspective of the gear frame.

Figure 4 is a detail view in perspective of one of the shaft supporting brackets.

Figure 5 is a detail view in perspective showing, separated, the principal elements constituting one of the sprags.

Figure 6 is a detail view in elevation of the rockable shaft.

Referring now to the drawings in detail, it will be seen that the embodiment of the invention which has been illustrated comprises a pair of brackets designated generally by the reference numeral 1 which extend between the rear axle housings 2 of the automobile and the rear braces 3. Each bracket 1 includes a pair of bars 4 having their intermediate portions formed to provide bearings 5 and their rear end portions formed to provide clamps 6 which encircle the rear axle housings 2, said bars 4 being secured together by bolts 7. At their forward ends, the bars 4 terminate in angularly extending jaws 8 between which the braces 3 are clamped.

Journaled for rocking movement in the bearings 5 is a shaft 9 having a substantially U-shaped intermediate portion 10 which accommodates the differential housing 11 of the automobile. Fixed on the end portions of the shaft 9 are downwardly and rearwardly extending sprags 12 on the lower ends of which toothed feet 13 are adjustably secured. The lower end portions of the sprags 12 have formed thereon teeth 14 and are provided with polygonal slots 15. On one side, the feet 13 have formed thereon substantially square lugs 16 which are slidably engaged in the slots 15. Bolts 17 adjustably secure the feet 13 to the sprags 12. Toothed plates 18, through which the bolts 17 pass, are engaged with the teeth 14 for positively securing the feet 13 in adjusted position. The lugs 16 engaged in the slots 15 retain the feet 13 against rotation on the sprags 12.

Extending between the shaft 9 and one of the braces 3 is a frame which is designated generally by the reference numeral 19. The frame 19 comprises a pair of spaced bars 20 in the rear end portions of which the shaft 9 is journaled. Projecting at an angle from the forward end portion of one of the bars 20 are jaws 21 which are engageable with the adjacent brace 3. Journaled between the bars 20 is a gear 22 from which an arm 23 projects. The gear 22 drives a gear 24 which is fixed on the shaft 9 between the bars 20.

The arm 23 is connected by a rod 25 to a foot pedal 26 which is journaled on a suitable bracket 27 which is mounted between the frame 28 of the vehicle and the adjacent front brace 29. It will be noted that the foot pedal 26 is mounted adjacent the usual clutch pedal 30 of the vehicle. Also connected to the arm 23 is a spring 31 for raising the sprags 12 to inoperative position, as suggested in dotted lines in Figure 2 of the drawings.

It is thought that the operation of the invention will be readily apparent from a consideration of the foregoing. The spring 31 normally maintains the sprags 12 in raised position. When it is desired to bring the invention into use, the foot pedal 26 is actuated to rotate the shaft 9 through the medium of the rod 25, the arm 23 and the gears 22 and 24, thus swinging the sprags 12 downwardly and bringing the toothed feet 13 thereof into engagement with the slippery surface over which the vehicle is traveling. In this manner skidding or sliding of the vehicle will be prevented and, if desired, said vehicle may be brought to a stop. The device is also particularly useful for preventing vehicles from rolling backward down hills. When pressure is removed from the foot pedal 26 the spring 31 returns the sprags 12 to raised or inoperative position. If desired, the device may be connected to the clutch pedal 30 or to the usual foot brake pedal of the automobile for actuation thereby.

It is believed that the many advantages of a vehicle safety device constructed in accordance with the present invention will be readily understood, and although a preferred embodiment of the invention is as illustrated and described, it is to be understood that changes in the details of construction and in the combination and arrangement of parts may be resorted to which will fall within the scope of the invention as claimed.

What is claimed is:—

1. A safety device for automobiles of the type including rear axle housings and forwardly converging braces connected to said housings, comprising brackets extending between the axle housings and the braces, a shaft journaled on said brackets, sprags fixed on said shaft, and means for actuating the shaft for engaging the sprags with the surface over which the automobile is traveling.

2. A safety device for automobiles of the type including rear axle housings and forwardly converging braces connected to said housings, comprising brackets extending between the axle housings and the braces, a shaft journaled on said brackets, sprags fixed on said shaft, and means for actuating the shaft for engaging the sprags with the surface over which the automobile is traveling, said means including a frame comprising spaced bars having one end journaled on the shaft, a gear fixed on said shaft between the bars, means for securing the other end portion of the frame to one of the braces, a gear journaled between the bars and engaged with the first-named gear, an arm projecting from the second-named gear, and an actuating rod connected to said arm.

3. A safety device for automobiles comprising a shaft rockably mounted on an automobile, means for actuating said shaft, and sprags fixed on said shaft for engagement with the surface over which the automobile is traveling, said sprags including teeth on their lower end portions and further having substantially polygonal slots in said lower end portions, toothed feet adjustably mounted on the sprags and including polygonal lugs engaged in the slots, and toothed plates connected to said teeth and engaged in the first-named teeth for securing said teeth in adjusted position.

ALBERT BORLAND.
MYRTLE BORLAND.